(12) United States Patent
Bergmann et al.

(10) Patent No.: US 8,794,947 B2
(45) Date of Patent: Aug. 5, 2014

(54) TRANSLATING FORMING DIES

(75) Inventors: Blaise F. Bergmann, Clearwater, KS (US); Michael C. Dowling, Derby, KS (US); Mark S. Williams, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 230 days.

(21) Appl. No.: 13/185,299

(22) Filed: Jul. 18, 2011

(65) Prior Publication Data

US 2013/0022703 A1    Jan. 24, 2013

(51) Int. Cl.
  *B29C 43/24*    (2006.01)
  *B29C 33/20*    (2006.01)

(52) U.S. Cl.
  USPC ........... 425/116; 425/134; 425/149; 425/150; 425/195; 425/259; 425/347; 425/385; 425/395; 425/415; 425/416; 425/423; 425/451; 425/451.9; 425/470; 72/389.4; 72/414; 72/473

(58) Field of Classification Search
  CPC ...... B29C 43/04; B29C 33/0027; B29C 33/22
  USPC ......... 425/116–117, 134, 195, 259, 261, 347, 425/385, 394, 395, 408, 415, 416, 423, 434, 425/451.9, 452, 460, 470, 450.1, 451, 149, 425/150; 264/263, 275, 284, 297.6, 297.7, 264/299, 323, 328.8; 156/209, 240; 72/389.4, 414, 473
  See application file for complete search history.

(56) References Cited

U.S. PATENT DOCUMENTS

| | | | | |
|---|---|---|---|---|
| 4,233,006 A | * | 11/1980 | Panas | 425/4 R |
| 4,698,001 A | * | 10/1987 | Vismara | 425/4 R |
| 5,592,847 A | * | 1/1997 | Sarkisian et al. | 72/356 |
| 6,004,602 A | * | 12/1999 | D'Alterio | 426/285 |
| 6,394,786 B1 | * | 5/2002 | Hefner | 425/556 |
| 6,428,730 B1 | * | 8/2002 | Nishida | 264/255 |
| 7,604,764 B2 | * | 10/2009 | Arai et al. | 264/263 |
| 7,837,460 B2 | * | 11/2010 | Nishida | 425/395 |
| 7,855,494 B2 | * | 12/2010 | Umezawa | 313/113 |
| 7,879,277 B2 | * | 2/2011 | Nishida | 264/250 |
| 8,197,744 B2 | * | 6/2012 | Knueppel et al. | 264/523 |
| 8,202,466 B2 | * | 6/2012 | Guan | 264/328.8 |

(Continued)

FOREIGN PATENT DOCUMENTS

| | | | | |
|---|---|---|---|---|
| DE | 102004063658 A1 | * | 7/2006 | B29C 44/58 |
| JP | 53145872 A | * | 12/1978 | B29C 45/00 |

(Continued)

*Primary Examiner* — Dimple Bodawala
(74) *Attorney, Agent, or Firm* — Hovey Williams LLP

(57) ABSTRACT

A translating die apparatus and method for forming a piece of material into a part having complex contours. The translating die apparatus may comprise upper and lower mounts, fixed upper and lower dies fixed to the upper and lower mounts, respectively, and movable upper and lower dies translatably coupled with the mounts and configured to translate laterally toward and away from the fixed upper and lower dies. The piece of material may be placed between the upper and lower dies and one of the mounts may be actuated toward another of the mounts to sandwich the piece of material between the upper and lower dies. Simultaneously, the movable upper and lower dies may translate toward the fixed upper and lower dies, until the movable and fixed dies abut each other when the upper and lower dies are fully pressing the piece of material therebetween.

16 Claims, 2 Drawing Sheets

(56) References Cited

U.S. PATENT DOCUMENTS

| | | | |
|---|---|---|---|
| 2006/0073226 A1* | 4/2006 | Kimura et al. | 425/129.1 |
| 2007/0172539 A1* | 7/2007 | Wang et al. | 425/577 |
| 2007/0210469 A1* | 9/2007 | Iimura et al. | 264/40.1 |
| 2009/0057949 A1* | 3/2009 | Izumo | 264/274 |
| 2009/0243460 A1* | 10/2009 | Umezawa | 313/110 |
| 2011/0100542 A1* | 5/2011 | Faulkner et al. | 156/245 |
| 2011/0155325 A1* | 6/2011 | Lee et al. | 156/443 |

FOREIGN PATENT DOCUMENTS

| | | | | |
|---|---|---|---|---|
| JP | 2001315173 A | * | 11/2001 | B29C 45/33 |
| JP | 2004345242 A | * | 12/2004 | B29C 45/16 |
| JP | 2006015738 A | * | 1/2006 | B29C 45/00 |

* cited by examiner

TRANSLATING FORMING DIES

BACKGROUND

1. Field

The present invention generally relates to systems and methods for forming flexible or malleable materials with forming dies.

2. Prior Art

Uncured composite materials can be formed between two forming dies to provide the composite material with a complex shape or cross-section. The forming dies typically include an upper and lower die, or what may be referred to as a female die and a male die, which are configured to mate together. For example, the female die may have at least one cavity formed therein which is complementary in shape and dimension to at least one protrusion of the male die. One or both of the dies are typically movable toward and away from each other manually or by some automated means.

When uncured composite material is placed between the male and female dies and one of the dies is moved toward the other (or both of the dies are moved toward each other), the material is formed therebetween. However, in some configurations with multiple complex contours, a portion of the material may become trapped between portions of the male and female dies before they fully mate. This may induce tension in the portions between these trapped portions of the material as the male and female dies continue to move toward each other. Some materials have insufficient tensile strength to withstand these induced loads without damage. In particular, uncured composite materials are essentially inelastic and can be subject to unacceptable fiber distortion if subjected to external loads.

Therefore, there is a need for an improved method of material forming which does not suffer from the limitations of the prior art.

SUMMARY

Embodiments of the present invention relate to a translating die apparatus for forming a piece of material. The translating die apparatus may be movable between a closed configuration and an open configuration. Specifically, the translating die apparatus may comprise a first fixed die, a second fixed die, a first movable die, and a second movable die. The second fixed die may be shaped and configured to selectively mate with at least a portion of the first fixed die when the translating die apparatus is in the closed configuration and to be spaced a distance apart from the first fixed die when the translating die apparatus is in the open configuration.

The first movable die may be laterally aligned with and translatably coupled to the first fixed die. The second movable die may be laterally aligned with and translatably coupled with the second fixed die. Furthermore, the second movable die may be shaped and configured to selectively mate with at least a portion of the first movable die when the translating die apparatus is in the closed configuration and to be spaced a distance apart from the first movable die when the translating die apparatus is in the open configuration.

Another embodiment of the translating die apparatus may comprise first and second fixed dies, first and second movable dies, a first mount, and a second mount. The second mount may be movably coupled with the first mount and configured to move between an open configuration and a closed configuration. The first fixed die may be fixed to the first mount and the second fixed die may be fixed to the second mount. The first movable die may be laterally aligned with and translatably coupled to the first fixed die via translatable attachment to the first mount. Likewise, the second movable die may be laterally aligned with and translatably coupled with the second fixed die via translatable attachment to the second mount.

In yet another embodiment of the present invention, a method of forming a piece of material may comprise the steps of placing a piece of material between a first and second portion of a translating die apparatus. The first portion of the translating die apparatus may comprise a first mount, a first fixed die fixed to the first mount, and a first movable die laterally aligned with and translatably coupled to the first fixed die and translatably attached to the first mount. The second portion of the translating die apparatus may comprise a second mount movably coupled with the first mount and configured to move between an open configuration and a closed configuration, a second fixed die fixed to the second mount, and a second movable die laterally aligned with and translatably coupled with the second fixed die and translatably attached to the second mount. The method may further comprise actuating the second mount toward the piece of material and the first mount such that portions of the piece of material become pinned between the first and second fixed dies or the first and second movable dies. The method may also comprise the step of actuating the first and second movable dies to translate toward the first and second fixed dies substantially simultaneously to the actuation of second mount toward the first mount.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
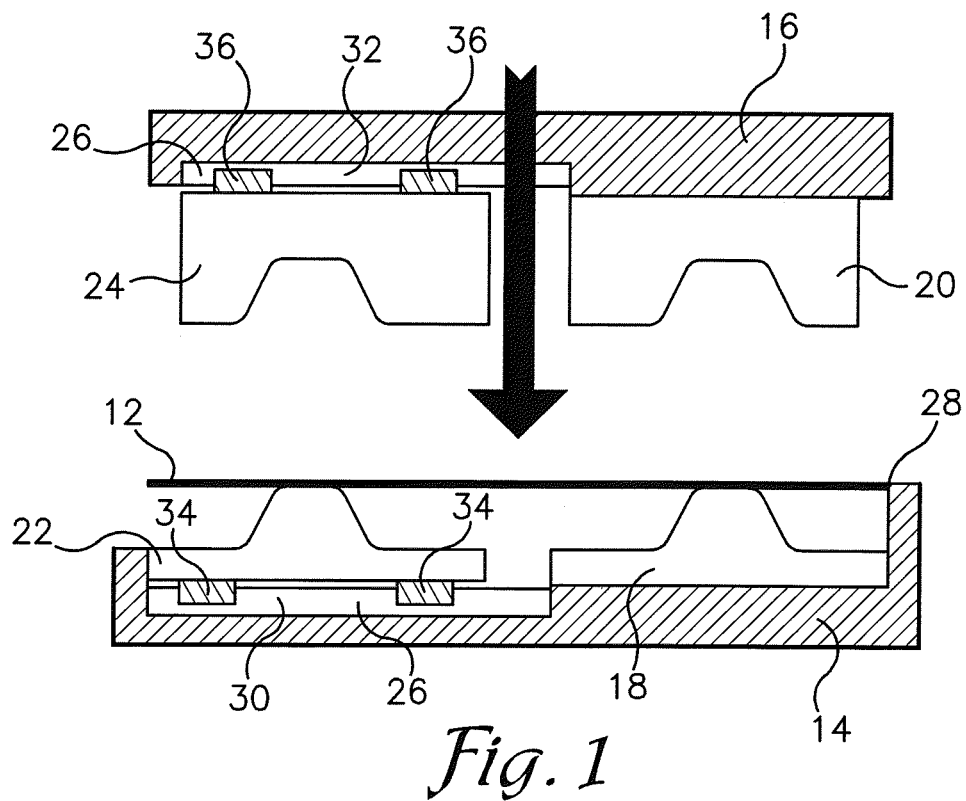
FIG. 1 is a side view of a translating die apparatus constructed in accordance with embodiments of the present invention and illustrated in an open configuration.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
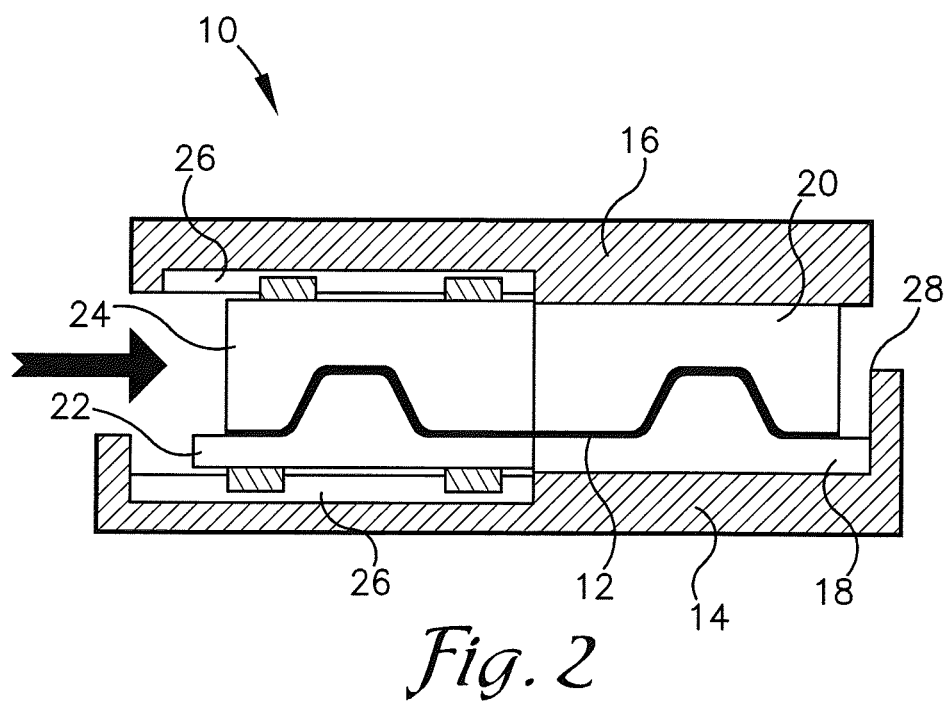
FIG. 2 is a side view of the translating die apparatus of FIG. 1 in a closed configuration.

The present invention, as illustrated in FIGS. 1 and 2, provides a translating die apparatus 10 for shaping a flexible or malleable piece of material 12 to form one or more simple or complex-contours therein. The piece of material 12 may be uncured composite material, such as composite laminate, a plastic sheet of material, a malleable metal material, or any other sheet of material shapeable using pressure. In some embodiments of the invention, the piece of material 12 may be formable, but inelastic. The translating die apparatus 10 may comprise a lower mount 14, an upper mount 16, a fixed lower die 18, a fixed upper die 20, a movable lower die 22, and a movable upper die 24. Additionally, the translating die apparatus 10 may comprise translating mechanisms 26 and/or a control system (not shown) configured to actuate portions of the translating die apparatus 10 toward and away from each other, as described herein.

The lower mount 14 may be a rigid surface or component attached to or integrally formed with the fixed lower die 18 and coupled with the movable lower die 22, as later described herein. The lower mount 14 may also comprise an index feature 28 configured to denote where an edge of the piece of material 12 should be aligned prior to being shaped by the translating die apparatus 10. For example, the indexing feature 28 may be a protrusion or ledge extending upwardly from the lower mount 14 at or proximate an end thereof, as illustrated in FIGS. 1-2.

The upper mount 16 may be a rigid surface or component attached to or integrally formed with the fixed upper die 20 and coupled with the movable upper die 24, as later described herein. The upper mount 16 may be substantially vertically and/or laterally aligned with the lower mount 14 and configured to be actuated manually or in an automated manner toward and away from the lower mount 14. Alternatively, the lower mount 14 may be configured to move toward the upper mount 16 or both the lower mount 14 and the upper mount 16 may be configured to be actuated toward and away from each other. This actuation may be provided through any physical, electrical, mechanical, and/or pneumatic means (not shown).

The fixed lower die 18 may be fixed to and/or integrally-formed with the lower mount 14. Likewise, the fixed upper die 20 may be fixed to and/or integrally-formed with the upper mount 16. The fixed upper die 20 may have a surface contoured to complement a contour of the fixed lower die 18. For example, the fixed upper die 20 may have a channel or cavity formed therein complementary in shape and dimension to a protrusion extending from the fixed lower die, or vice versa. As illustrated in FIGS. 1-2, the fixed upper die 20 may comprise a cavity or channel formed therein having a substantially trapezoid-shaped cross-section, while the fixed lower die 18 may comprise a protrusion having a substantially trapezoid-shaped cross-section. However, the fixed upper and lower dies 18,20 may have any contours, protrusions, or cavities formed therein of any shape without departing from the scope of the invention.

The movable lower die 22 may be translatably coupled to the lower mount 14 and configured to translate between a first position a space away from the fixed lower die 18 and a second position with the movable lower die 22 directly adjacent to and/or abutting a portion of the fixed lower die 18. Likewise, the movable upper die 24 may be translatable coupled to the upper mount 16 and configured to translate between a first position a space away from the fixed upper die 20 and a second position with the movable upper die 24 directly adjacent to and/or abutting a portion of the fixed upper die 20. As with the fixed upper and lower dies 18,20, the movable lower die 22 may have a surface contoured to compliment a shape and configuration of a surface of the movable upper die 24. For example, the movable upper die 24 may have a channel or cavity formed therein complimentary in shape and dimension to a protrusion extending from the movable lower die 22, or vice versa. As illustrated in FIGS. 1-2, the movable upper die 24 may comprise a cavity or channel formed therein having a substantially trapezoid-shaped cross-section, while the movable lower die 22 may comprise a protrusion having a substantially trapezoid-shaped cross-section. However, the movable upper and lower dies 22,24 may have any contours, protrusions, or cavities formed therein of any shape without departing from the scope of the invention.

The translating mechanisms 26 may comprise any components configured for translating the movable upper die 24 and/or the movable lower die 22. For example, the translating mechanisms 26 may comprise track assemblies including a lower rail 30 fixed to the lower mount 14, an upper rail 32 fixed to the upper mount 16, and rollable, slidable, or otherwise translatable lower and upper engaging mechanisms 34,36 configured to translatably engage with the lower and upper rails 30,32, respectively. However, any mechanical, electro-mechanical, and/or pneumatic means for translating the movable upper and lower dies 22,24 may be used without departing from the scope of the invention.

The control system (not shown) may include any number or combination of controllers, circuits, integrated circuits, programmable logic devices, computers, processors, microcontrollers, or other control devices, as well as electrical conduits, transceivers, and/or residential or external memory for storing data and other information programmed therein, received by various sensors, and/or input by an operator. The residential or external memory may be integral with the control system, stand alone memory, or a combination of both. The memory may include, for example, removable and non removable memory elements such as RAM, ROM, flash, magnetic, optical, USB memory devices, and/or other memory elements. The control system may also comprise robotic, electromechanical, and/or electro-pneumatic devices configured for actuating movement of objects, such as moving the upper and/or lower mounts 14,16 toward and away from each other.

The control system and at least some of the method steps described herein may be implemented in hardware, software, firmware, or a combination thereof. In some embodiments of the invention, the control system may implement a computer program, executable computer code, and/or code segments to perform some of the functions and method described herein. The computer program may comprise an ordered listing of executable instructions for implementing logical functions in the control system. The computer program can be embodied in any computer-readable medium for use by or in connection with an instruction execution system, apparatus, or device, and execute the instructions. In the context of this application, a "computer-readable medium" can be any means that can contain or store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The control system may be configured for actuating the upper mount 16 toward the lower mount 14 and/or the lower mount 14 toward the upper mount 16. Alternatively, the control system may be configured for actuating the upper mount 16 and the lower mount 14 substantially simultaneously toward each other. In some embodiments of the invention, the control system may also be configured to translate the movable upper die 24 toward the fixed upper die 20 and/or to translate the movable lower die 22 toward the fixed lower die 18. However, in some embodiments of the invention, the control system or portions thereof, as described below, may be omitted, and an operator or user may manually actuate movement of the upper mount 16, lower mount 14, movable upper die 24, and/or movable lower die 22.

In use, the piece of material 12 may be aligned with the indexing feature 28 and placed between the movable upper and lower dies 22,24 and the fixed upper and lower dies 18,20. Then the upper mount 16 and/or the lower mount 14 may be actuated (manually or by the control system) toward each other. As the piece of material 12 becomes trapped between features of the movable and fixed upper and lower dies 18-24, the movable upper and lower dies 22,24 may translate toward the fixed upper and lower dies 18,20. This may be accomplished by tension within the piece of material 12 being formed or the movable upper and lower dies 22,24 can be mechanically or pneumatically driven toward the fixed upper and lower dies 18,20, if required. For example, if the piece of material 12 being formed has insufficient tensile strength to withstand the induced loads caused when the upper mount 16 is moved toward the lower mount 14 without damage thereto, then mechanically or pneumatically driving the movable upper and lower dies 22,24 toward the fixed upper and lower dies 18,20 may relieve some of the tension in the piece of material 12 during forming. Specifically, uncured composite materials can be subject to unacceptable fiber distortion if subject to external loads while formed. The translating die apparatus 10 is configured to relieve the tension placed on the piece of material 12 during forming.

Figure 3:
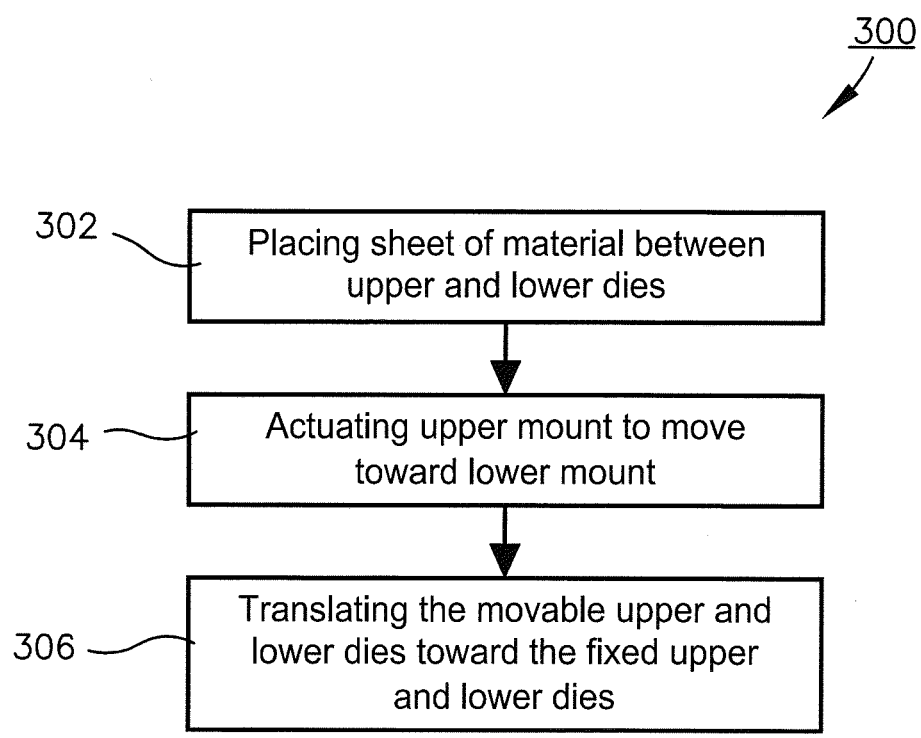
FIG. 3 is a flow chart of method steps for forming a sheet of material in accordance with embodiments of the present invention.

The flow chart of FIG. 3 depicts the steps of an exemplary method 300 of forming a material. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

The method 300, as illustrated in FIG. 3, may include the steps of placing a sheet of material between the upper and lower dies 18-24, as depicted in block 302. Specifically, the sheet of material 12 may be placed on the lower dies 18,22 while the translating die apparatus 10 is in an open configuration, such that the upper dies 20,24 and the lower dies 18,22 are spaced apart from each other. In some embodiments of the invention, step 302 may also include aligning the piece of material 12 with the index feature 28 to ensure proper placement of various features formed into the material by the dies. The method 300 may also comprise a step of actuating the upper mount 16 to move toward the lower mount 14, as depicted in block 304. For example, an arrow in FIG. 1 illustrates a direction of movement of the upper mount 16 toward the lower mount 14. As mentioned above, this step may alternatively involve actuating the lower mount 14 to move toward the upper mount 16 or actuating both the upper and lower mounts 14,16 to move toward each other.

The method 300 may also comprise the step of translating the movable upper and lower dies 22,24 toward the fixed upper and lower dies 18,20, as depicted in block 306 and illustrated by an arrow in FIG. 2 showing the direction of movement of the movable dies 22,24. In some embodiments of the invention, tension is induced in the piece of material 12 between portions of the piece of material 12 which become trapped between the movable and fixed upper dies 20,24 and the movable and fixed lower dies 18,22 during step 304, and this tension inherently pulls the movable upper and lower dies 22,24 toward the fixed upper and lower dies 18,20. However, in other embodiments of the invention, as described above, the control system and/or an operator may actuate the movable upper and lower dies 22,24 to translate toward the fixed upper and lower dies 18,20 at a desired rate. The rate of translation of the movable upper and lower dies 22,24 may be dependent on a rate at which the upper and/or lower mounts 14,16 are moving toward each other, the type of material 12, the types and dimensions of the contours in the surface of the dies 18-24, and other variables which may affect the amount of tension induced and/or the amount of tension allowable in the piece of material 12.

In some embodiments of the invention, the movable upper and lower dies 22,24 may rest substantially flush with their corresponding fixed upper and lower dies 18,20 when the piece of material 12 is fully sandwiched between the upper and lower dies 18-24 in a closed configuration of the translating die apparatus 10. The translating die apparatus 10 may be used, as described above, to form composite aircraft components such as stringers for a fuselage or any other composite components. Additionally or alternatively, the translating die apparatus 10 may be used to form any piece or pieces of material flexible or malleable enough to be pressed into a given shape between two dies. In some embodiments of the invention, heat may be applied before and/or during the translating of the movable dies 22, 24 to improve the formability of the piece of material 12. Furthermore, in some embodiments of the invention, once the piece of material 12 is formed between portions of the translating die apparatus 10, the translating die apparatus 10 may keep the piece of material 12 in that configuration during a curing or hardening process. Then the cured piece of material 12 may be removed from the translating die apparatus 10 once it is rigid enough to maintain the shape imparted thereto without the translating die apparatus 10.

An initial spacing or straight-line distance between the most protruding points of the movable lower die 22 and the fixed lower die 18 may be set to approximately equal a desired surface distance along the contours of a desired part to be formed with the piece of material 12. This same initial spacing may be used between the movable upper die 24 and the fixed upper die 20. So, for example, the amount of the piece of material 12 extending in a straight line between the most protruding portions of the movable lower die 22 and the fixed lower die 18 in FIG. 1 is equal to the amount of the piece of material 12 extending between these most protruding portions in FIG. 2 along the contours of the lower dies 18,22, when the dies 18-24 are in the closed configuration.

Advantageously, the simultaneous translation of the movable dies 22,24 as the upper dies 20,24 are actuated toward the lower dies 18,22 (or vice versa) enables forming the piece of material 12 from a flat configuration into a complex shape without stretching or elongated the piece of material 12. Specifically, this allows for the incorporation of unique features in the piece of material 12, such as cutouts or thickness changes, and also allows for accurate control of the final location for these features in the resulting formed part. This may be particularly useful when forming uncured composite materials, which are essentially inelastic.

Although the invention has been described with reference to the preferred embodiment illustrated in the attached drawing figures, it is noted that equivalents may be employed and substitutions made herein without departing from the scope of the invention as recited in the claims. For example, the terms "upper" and "lower," as used in the names of various components herein, do not preclude the translating die apparatus 10 from being used in various other orientations. For example, while the translating die apparatus 10 is illustrated with the upper mount 16 aligned vertically above the lower mount 13, in an alternative embodiment of the invention, the lower mount 14 may be placed in a substantially vertical orientation and the upper mount 16 may be laterally aligned to move substantially horizontally toward and away from the lower mount 14, with the movable upper and lower dies 22,24 moving vertically toward and away from the fixed upper and lower dies 18,20.

Having thus described various embodiments of the invention, what is claimed as new and desired to be protected by Letters Patent includes the following:

1. A translating die apparatus for forming a piece of material, the translating die apparatus comprising:
   a first fixed die;
   a second fixed die, wherein at least one of the first fixed die and the second fixed die is movable relative to the other between a closed configuration and an open configuration, wherein the second fixed die is shaped and configured to selectively mate with at least a portion of the first fixed die when the translating die apparatus is in the closed configuration and to be spaced a distance apart from the first fixed die when the translating die apparatus is in the open configuration;
   a first movable die laterally aligned with and translatably coupled to the first fixed die;
   a second movable die laterally aligned with and translatably coupled with the second fixed die, wherein at least one of the first movable die and the second movable die is movable relative to the other between the closed configuration and the open configuration, wherein the second movable die is shaped and configured to selectively mate with at least a portion of the first movable die when in the closed configuration and to be spaced a distance apart from the first movable die when in the open configuration,
   wherein the first and second movable dies are operable to translate toward and away from the first and second fixed dies,
   wherein movement of the dies between the closed and open configuration is transverse to translation of the first and second movable dies toward and away from the first and second fixed dies.

2. The translating die apparatus of claim 1, further comprising translating mechanisms translatably coupling the first movable die with the first fixed die and the second movable die with the second fixed die.

3. The translating die apparatus of claim 1, further comprising a first mount to which the first fixed die and the first movable die are coupled and a second mount to which the second fixed die and the second movable die are coupled.

4. The translating die apparatus of claim 3, wherein at least one of the first mount and the second mount are movably coupled with each other and selectively movable toward and away from the other of the first mount and the second mount between the closed and the open configurations.

5. The translating die apparatus of claim 1, wherein the first fixed die has a protrusion that substantially matches a size and shape of a cavity formed into the second fixed die.

6. The translating die apparatus of claim 1, wherein the first movable die has a protrusion that substantially matches a size and shape of a cavity formed into the second fixed die.

7. The translating die apparatus of claim 1, further comprising a control system configured for actuating the second fixed die and the second movable die toward the first fixed die and the first movable die, respectively.

8. The translating die apparatus of claim 7, wherein the control system is further configured for actuating translation of the first and second movable dies toward the first and second fixed dies, respectively, while actuating the second fixed die and the second movable die toward the first fixed die and the first movable die, respectively.

9. The translating die apparatus of claim 2, wherein the translating mechanisms comprise a first rail fixed relative to the first fixed die, a second rail fixed relative to the second fixed die, a first engaging mechanism fixed relative to the first movable die and translatably coupled to the first rail, and a second engaging mechanism fixed relative to the second movable die and translatably coupled to the second rail.

10. A translating die apparatus for forming a piece of material, the translating die apparatus comprising:
    a first mount;
    a second mount movably coupled with the first mount and configured to move between an open configuration and a closed configuration;
    a first fixed die fixed to the first mount;
    a second fixed die fixed to the second mount, shaped and configured to selectively mate with at least a portion of the first fixed die when the second mount is moved to the closed configuration and to be spaced a distance apart from the first fixed die when the second mount is moved to the open configuration;
    a first movable die laterally aligned with and translatably coupled to the first fixed die and translatably attached to the first mount;
    a second movable die laterally aligned with and translatably coupled with the second fixed die and translatably attached to the second mount, wherein the second movable die is shaped and configured to selectively mate with at least a portion of the first movable die when the second mount is moved to the closed configuration and to be spaced a distance apart from the first movable die when the second mount is moved to the open configuration,
    wherein the first and second movable dies are operable to translate with respect to the first and second mounts laterally toward and away from the first and second fixed dies,
    wherein movement of the second mount between the open configuration and the closed configuration is transverse to translation of the first and second movable dies toward and away from the first and second fixed dies.

11. The translating die apparatus of claim 10, further comprising translating mechanisms translatably coupling the first movable die with the first fixed die and the second movable die with the second fixed die.

12. The translating die apparatus of claim 10, wherein the first fixed die has a protrusion that substantially matches a size and shape of a cavity formed into the second fixed die.

13. The translating die apparatus of claim 10, wherein the first movable die has a protrusion that substantially matches a size and shape of a cavity formed into the second fixed die.

14. The translating die apparatus of claim 10, further comprising a control system configured for actuating the second fixed die and the second movable die toward the first fixed die and the first movable die, respectively.

15. The translating die apparatus of claim 14, wherein the control system is further configured for actuating translation of the first and second movable dies toward the first and second fixed dies, respectively, while actuating the second fixed die and the second movable die toward the first fixed die and the first movable die, respectively.

16. The translating die apparatus of claim 11, wherein the translating mechanisms comprise a first rail fixed to the first mount, a second rail fixed to the second mount, a first engaging mechanism fixed to the first movable die and translatably coupled to the first rail, and a second engaging mechanism fixed to the second movable die and translatably coupled to the second rail.

* * * * *